United States Patent
Butt et al.

(10) Patent No.: US 11,113,587 B2
(45) Date of Patent: Sep. 7, 2021

(54) SYSTEM AND METHOD FOR APPEARANCE SEARCH

(71) Applicant: Avigilon Corporation, Vancouver (CA)

(72) Inventors: Richard Butt, Vancouver (CA); Alexander Chau, Coquitlam (CA); Moussa Doumbouya, Melrose, MA (US); Levi Glozman, Littleton, MA (US); Lu He, Somerville, MA (US); Aleksey Lipchin, Newton, MA (US); Shaun P. Marlatt, North Vancouver (CA); Sreemanananth Sadanand, Malden, MA (US); Mitul Saha, Somerville, MA (US); Mahesh Saptharishi, Sudbury, MA (US); Yanyan Hu, Woburn, MA (US)

(73) Assignee: AVIGILON CORPORATION, Vancouver (CA)

( * ) Notice: Subject to any disclaimer, the term of this patent is extended or adjusted under 35 U.S.C. 154(b) by 0 days.

(21) Appl. No.: 16/908,026

(22) Filed: Jun. 22, 2020

(65) Prior Publication Data

US 2020/0320356 A1    Oct. 8, 2020

Related U.S. Application Data

(63) Continuation of application No. 15/832,654, filed on Dec. 5, 2017, now Pat. No. 10,726,312.
(Continued)

(51) Int. Cl.
*G06K 9/66* (2006.01)
*H04N 21/44* (2011.01)
(Continued)

(52) U.S. Cl.
CPC ............ *G06K 9/66* (2013.01); *G06K 9/00771* (2013.01); *G06K 9/2018* (2013.01);
(Continued)

(58) Field of Classification Search
CPC ............................. G06K 9/66; G06K 9/00771
See application file for complete search history.

(56) References Cited

U.S. PATENT DOCUMENTS

| 7,627,171 B2 | 12/2009 | Hampshire et al. |
| 8,170,280 B2 * | 5/2012 | Zhao ............... G06K 9/00711 382/103 |

(Continued)

FOREIGN PATENT DOCUMENTS

| JP | 2001005967 | 1/2001 |
| JP | 2010073112 A | 4/2010 |
| JP | 2015002553 A | 1/2015 |

OTHER PUBLICATIONS

Haohao et al., "Automatic Soccer Video Event Detection Based on a Deep Neural Network Combined CNN and RNN," 2016 IEEE 28th International Conference on Tools with Artificial Intelligence (ICTAI), pp. 490-494, Nov. 8, 2016 <https://ieeexplore.ieee.org/document/7814641>.
(Continued)

*Primary Examiner* — Tuan H Nguyen
(74) *Attorney, Agent, or Firm* — Perry + Currier, Inc.

(57) ABSTRACT

There is provided an appearance search system comprising one or more cameras configured to capture video of a scene, the video having images of objects. The system comprises one or more processors and memory comprising computer program code stored on the memory and configured when executed by the one or more processors to cause the one or more processors to perform a method. The method comprises identifying one or more of the objects within the images of the objects. The method further comprises imple-
(Continued)

menting a learning machine configured to generate signatures of the identified objects and generate a signature of an object of interest. The system further comprises a network configured to send the images of the objects from the camera to the one or more processors. The method further comprises comparing the signatures of the identified objects with the signature of the object of interest to generate similarity scores for the identified objects, and transmitting an instruction for presenting on a display one or more of the images of the objects based on the similarity scores.

11 Claims, 14 Drawing Sheets

Related U.S. Application Data

(60) Provisional application No. 62/527,894, filed on Jun. 30, 2017, provisional application No. 62/430,292, filed on Dec. 5, 2016.

(51) Int. Cl.
*H04N 21/466* (2011.01)
*G06T 7/70* (2017.01)
*G06K 9/62* (2006.01)
*H04N 21/4223* (2011.01)
*G06N 20/00* (2019.01)
*G06N 3/04* (2006.01)
*G06K 9/46* (2006.01)
*G06N 3/08* (2006.01)
*G06K 9/00* (2006.01)
*G06K 9/20* (2006.01)

(52) U.S. Cl.
CPC ......... *G06K 9/4628* (2013.01); *G06K 9/4671* (2013.01); *G06K 9/627* (2013.01); *G06K 9/6215* (2013.01); *G06N 3/0454* (2013.01); *G06N 3/084* (2013.01); *G06N 20/00* (2019.01); *G06T 7/70* (2017.01); *H04N 21/4223* (2013.01); *H04N 21/44* (2013.01); *H04N 21/44008* (2013.01); *H04N 21/466* (2013.01); *G06K 9/00986* (2013.01); *G06K 2009/00738* (2013.01)

(56) References Cited

U.S. PATENT DOCUMENTS

| | | | |
|---|---|---|---|
| 8,224,029 | B2 | 7/2012 | Saptharishi et al. |
| 8,934,709 | B2 | 1/2015 | Saptharishi et al. |
| 2006/0253491 | A1 | 11/2006 | Gokturk et al. |
| 2010/0124271 | A1 | 5/2010 | Martz et al. |
| 2010/0157065 | A1 | 6/2010 | Yata |
| 2011/0034176 | A1 | 2/2011 | Lord et al. |
| 2014/0333775 | A1 | 11/2014 | Naikal et al. |
| 2015/0104066 | A1 | 4/2015 | Shellshear |
| 2015/0379722 | A1* | 12/2015 | Goldberg ............. G06T 3/20 382/298 |
| 2016/0092736 | A1 | 3/2016 | Mai et al. |

OTHER PUBLICATIONS

Bromley, Jane et al., "Signature Verification Using a 'Siamese' Time Delay Neural Network", International Journal of Pattern Recognition and Artificial Intelligence 7.04, 1993, pp. 669-688.
International Search Report and Written Opinion dated Mar. 2, 2018, issued by the Canadian Intellectual Property Office in connection with PCT Application No. PCT/CA2017/051469, filed Dec. 5, 2017.
C. Nebauer, "Evaluation of Convolutional Neural Network for Visual Recognition", in IEEE Transactions on Neural Networks 9.04, Jul. 1998, pp. 685-696.
Liu, W. et al., "SSD: Single Shot MultiBox Detector", Dec. 29, 2016, retrieved from the Internet <URL: https://arxiv.org/pdf/1512.02325.pdf.
Supplementary European Search Report issued on corresponding European Application No. 17877733.0 dated May 15, 2020, 3 pages.
Dr. Mahesh Saptharishi, "Artificial Intelligence (AI) Driven Appearance Search with Dr. Mahesh Saptharishi", https://www.youtube.com/watch?v=EzTqg4FZk3s—dated Oct. 16, 2016.
Li, Annan, et al. "Clothing attributes assisted person reidentification." IEEE Transactions on Circuits and Systems for Video Technology 25.5 (2015): 869-878.
Nakamura, Yugo et al. "Proposal of Distributed Processing System for Realizing Effective Video Analysis in Local Environments"(with English Translation), Research Report of Information of Processing Society, vol. 2016-MBL-79 No. 32, Information Processing Society of Japan, vol. 2016-MBL-79, No. 32, pp. 1-7, May 19, 2016.
Shirai, Yoshiaki et al., "Human Tracking in Complex Environment" (with English abstract), Journal of Information Processing Society, vol. 43, SIG4 (CVIM 4), Computer Vision and Image Media, Information processing Society of Japan, vol. 43, No. SIG4 (CVIM 4), pp. 33-42, May 2002.

* cited by examiner

SYSTEM AND METHOD FOR APPEARANCE SEARCH

RELATED APPLICATIONS

The present application is a continuation of U.S. patent application Ser. No. 15/832,654, filed Dec. 5, 2017, which claims the benefit of U.S. provisional patent application No. 62/430,292, filed Dec. 5, 2016, and U.S. provisional patent application No. 62/527,894, filed Jun. 30, 2017, the entireties of all of which are hereby incorporated by reference.

FIELD

The present subject-matter relates to video surveillance, and more particularly to identifying objects of interest in the video of a video surveillance system.

BACKGROUND

Computer implemented visual object classification, also called object recognition, pertains to the classifying of visual representations of real-life objects found in still images or motion videos captured by a camera. By performing visual object classification, each visual object found in the still images or motion video is classified according to its type (such as, for example, human, vehicle, or animal).

Automated security and surveillance systems typically employ video cameras or other image capturing devices or sensors to collect image data such as video or video footage. In the simplest systems, images represented by the image data are displayed for contemporaneous screening by security personnel and/or recorded for later review after a security breach. In those systems, the task of detecting and classifying visual objects of interest is performed by a human observer. A significant advance occurs when the system itself is able to perform object detection and classification, either partly or completely.

In a typical surveillance system, one may be interested in detecting objects such as humans, vehicles, animals, etc. that move through the environment. However, if for example a child is lost in a large shopping mall, it could be very time consuming for security personnel to manually review video footage for the lost child. Computer-implemented detection of objects in the images represented by the image data captured by the cameras can significantly facilitate the task of reviewing relevant video segments by the security personnel in order to find the lost child in a timely manner.

That being said, computer-implemented analysis of video to detect and recognize objects and which objects are similar requires substantial computing resources especially as the desired accuracy increases. It would facilitate computer implementation if the processing could be distributed to optimize resource utilization.

SUMMARY

In a first aspect of the disclosure, there is provided an appearance search system comprising one or more cameras configured to capture video of a scene, the video having images of objects. The system comprises one or more processors and memory comprising computer program code stored on the memory and configured when executed by the one or more processors to cause the one or more processors to perform a method. The method comprises identifying one or more of the objects within the images of the objects. The method further comprises implementing a learning machine configured to generate signatures of the identified objects and generate a signature of an object of interest. The system further comprises a network configured to send the images of the objects from the camera to the one or more processors. The method further comprises comparing the signatures of the identified objects with the signature of the object of interest to generate similarity scores for the identified objects, and transmitting an instruction for presenting on a display one or more of the images of the objects based on the similarity scores.

The system may further comprise a storage system for storing the generated signatures of the identified objects, and the video.

The implemented learning machine may be a second learning machine, and the identifying may be performed by a first learning machine implemented by the one or more processors.

The first and second learning machines me comprise neural networks. The neural networks may comprise convolutional neural networks. The neutral networks or convolutional neural networks mat comprise trained models.

The system may further comprise one or more graphics processing units for running the first and second learning machines.

The one or more cameras may be further configured to capture the images of the objects using video analytics.

The one or more cameras may be further configured to filter the images of the objects by classification of the objects. The one or more cameras may be further configured to identify one or more of the images comprising human objects, and the network may be further configured to send only the identified images to the one or more processors.

The images of the objects may comprise portions of image frames of the video. The portions of the image frames may comprise first image portions of the image frames, the first image portions including at least the objects. The portions of the image frames may comprise second image portions of the image frames, the second image portions being larger than the first image portions. The first learning machine may be configured to outline one or more of, or all of, the objects within the second image portions, for the second learning machine.

The one or more cameras may be further configured to generate reference coordinates for allowing extraction from the video of the images of the objects. The storage system may be configured to store the reference coordinates.

The one or more cameras may be further configured to select one or more images from the video captured over a period of time for obtaining one or more of the images of the objects.

The identifying of the objects may comprise outlining the one or more of the objects in the images.

The identifying may comprise identifying multiple ones of the objects within at least one of the images; and dividing the at least one of images into multiple divided images, each divided image comprising at least a portion of one of the identified objects. The method may further comprise, for each identified object: determining a confidence level; and if the confidence level does not meet a confidence requirement, then causing the identifying and the dividing to be performed by the first learning machine; or if the confidence level meets the confidence requirement, then causing the identifying and the dividing to be performed by the second learning machine.

The one or more cameras may further comprise one or more video analytics modules for determining the confidence level.

In a further aspect of the disclosure, there is provided a method comprising capturing video of a scene, the video having images of objects. The method further comprises identifying one or more of the objects within the images of the objects. The method further comprises generating, using a learning machine, signatures of the identified objects, and a signature of an object of interest. The method further comprises generating similarity scores for the identified objects by comparing the signatures of the identified objects with the first signature of the object of interest. The method further comprises presenting on a display one or more of the images of the objects based on the similarity scores.

The method may further comprise performing any of the steps or operations described above in connection with the first aspect of the disclosure.

In a further aspect of the disclosure, there is provided a computer-readable medium having stored thereon computer program code executable by one or more processors and configured when executed by the one or more processors to cause the one or more processors to perform a method. The method comprises capturing video of a scene, the video having images of objects. The method further comprises identifying one or more of the objects within the images of the objects. The method further comprises generating, using a learning machine, signatures of the identified objects, and a signature of an object of interest. The method further comprises generating similarity scores for the identified objects by comparing the signatures of the identified objects with the first signature of the object of interest. The method further comprises presenting on a display one or more of the images of the objects based on the similarity scores.

The method performed by the one or more one or more processors may further comprise performing any of the steps or operations described above in connection with the first aspect of the disclosure.

In a further aspect of the disclosure, there is provided a system comprising: one or more cameras configured to capture video of a scene. The system further comprises one or more processors and memory comprising computer program code stored on the memory and configured when executed by the one or more processors to cause the one or more processors to perform a method. The method comprises extracting chips from the video, wherein the chips comprise images of objects. The method further comprises identifying multiple objects within at least one of the chips. The method further comprises dividing the at least one chip into multiple divided chips, each divided chip comprising at least a portion of one of the identified objects.

The method may further comprise implementing a learning machine configured to generate signatures of the identified objects and generate a signature of an object of interest. The learning machine may be a second learning machine, and the identifying and the dividing may be performed by a first learning machine implemented by the one or more processors. The method may further comprise, for each identified object: determining a confidence level; and if the confidence level does not meet a confidence requirement, then causing the identifying and the dividing to be performed by the first learning machine; or if the confidence level meets the confidence requirement, then causing the identifying and the dividing to be performed by the second learning machine. The one or more cameras may comprise one or more video analytics modules for determining the confidence level.

The at least one chip may comprise at least one padded chip. Each padded chip may comprise a first image portion of an image frame of the video. The at least one chip may further comprise at least one non-padded chip. Each non-padded chip may comprise a second image portion of an image frame of the video, the second image portion being smaller than the first image portion.

In a further aspect of the disclosure, there is provided a computer-readable medium having stored thereon computer program code executable by one or more processors and configured when executed by the one or more processors to cause the one or more processors to perform a method. The method comprises obtaining video of a scene. The method further comprises extracting chips from the video, wherein the chips comprise images of objects. The method further comprises identifying multiple objects within at least one of the chips. The method further comprises dividing the at least one chip into multiple divided chips, each divided chip comprising at least a portion of one of the identified objects.

The method performed by the one or more one or more processors may further comprise performing any of the steps or operations described above in connection with the immediately above-described system.

In a further aspect of the disclosure, there is provided an appearance search system comprising: cameras for capturing videos of scenes, the videos having images of objects; a processor with a learning machine for generating signatures from the images of the objects associated with the videos and for generating a first signature from a first image of an object of interest; a network for sending the images of the objects from the cameras to the processor; and a storage system for storing the generated signatures of the objects and the associated videos; wherein the processor further compares the signatures from the images with the first signature of the object of interest to generate similarity scores, and further prepares the images of the objects with higher similarity scores for presentation to users at a display.

According to some example embodiments, the learning machine is a neural network.

According to some example embodiments, the neural network is a convolutional neural network.

According to some example embodiments, the neutral network is a trained model.

According to some example embodiments, a graphics processing unit is used for running the learning machine.

According to some example embodiments, the images of objects are captured at the cameras and processed using video analytics at the cameras.

According to some example embodiments the images, of objects are filtered by classification of object type at the cameras before being sent to the processor.

According to some example embodiments, the object type being sent to the processor is human.

According to some example embodiments, the cameras capturing the images of objects from the videos further comprises capturing reference coordinates of the images within the videos such that the images of objects can be extracted from the videos based on the reference coordinates.

According to some example embodiments, the images extracted from the video are deleted and the storage system stores the signatures, the reference coordinates, and the video.

According to some example embodiments, the video analytics selects one or more images of an object over a period of time to represent the captured images of the object of the period of time.

In a further aspect of the disclosure, there is provided a computer-implemented method of appearance searching for an object of interest which is in videos captured by a camera, the method comprising: extracting images of objects from the videos taken by the camera; sending the images of the objects and the videos over a network to a processor; generating, by the processor, signatures from the images of the objects using a learning machine; storing the signatures of the objects and the videos, associated with the objects, in a storage system; generating, by the processor, a signature from an image of any object of interest using the learning machine; comparing, by the processor, the signatures from the images in the storage system with the signature of the object of interest to generate a similarity score for each comparison; and preparing the images of the objects with higher similarity scores for presentation to users at a display.

In a further aspect of the disclosure, there is provided a computer implemented method of appearance searching for an object of interest which is in videos captured by a camera, the method comprising: extracting images of objects from the videos taken by the camera; sending the images of the objects and the videos over a network to a processor; generating, by the processor, signatures from the images of the objects using a learning machine wherein the images of the objects comprises images of the object of interest; storing the signatures of the objects and the videos, associated with the objects, in a storage system; searching through the storage system for an instance of an image of the object of interest; retrieving from the storage the signature of the object of interest for the instance of the image of the object of interest; comparing, by the processor, the signatures from the images in the storage system with the signature of the object of interest to generate a similarity score for each comparison; and preparing the images of the objects with higher similarity scores for presentation to users at a display.

In a further aspect of the disclosure, there is provided a non-transitory computer-readable storage medium, having stored thereon instructions, that when executed by a processor, cause the processor to perform a method for appearance searching of an object of interest which is in videos captured by a camera, the method comprising: extracting images of objects from the videos taken by the camera; sending the images of the objects and the videos over a network to a processor; generating, by the processor, signatures from the images of the objects using a learning machine wherein the images of the objects comprises images of the object of interest; storing the signatures of the objects and the videos, associated with the objects, in a storage system; searching through the storage system for an instance of an image of the object of interest; retrieving from the storage the signature of the object of interest for the instance of the image of the object of interest; comparing, by the processor, the signatures from the images in the storage system with the signature of the object of interest to generate a similarity score for each comparison; and preparing the images of the objects with higher similarity scores for presentation to users at a display.

BRIEF DESCRIPTION OF THE DRAWINGS

The detailed description refers to the following figures, in which.

Figure 1:
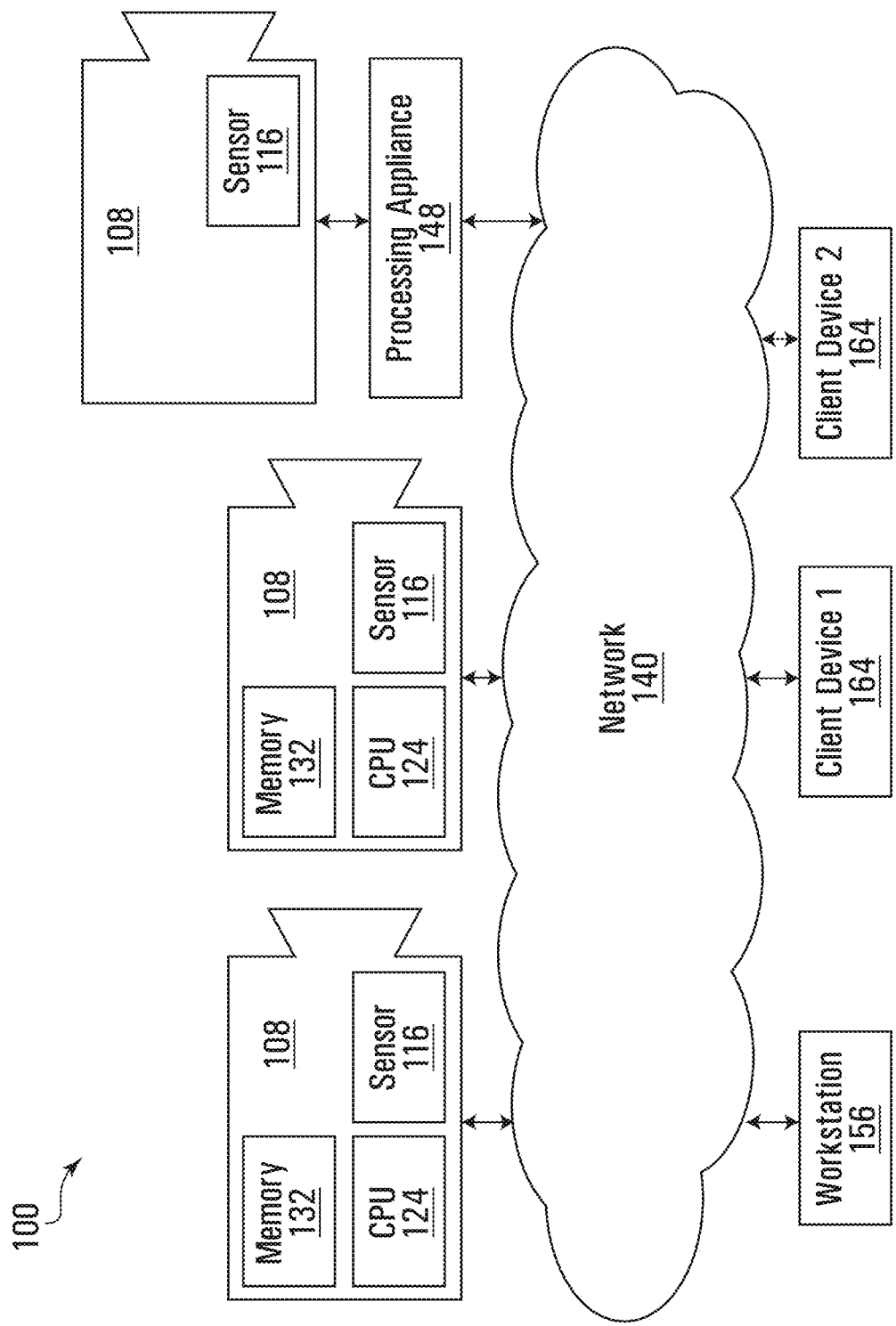
FIG. 1 illustrates a block diagram of connected devices of a video capture and playback system according to an example embodiment.

It will be appreciated that for simplicity and clarity of illustrates, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 or camera 108 is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one exemplary embodiment, and as illustrated in FIG. 1, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
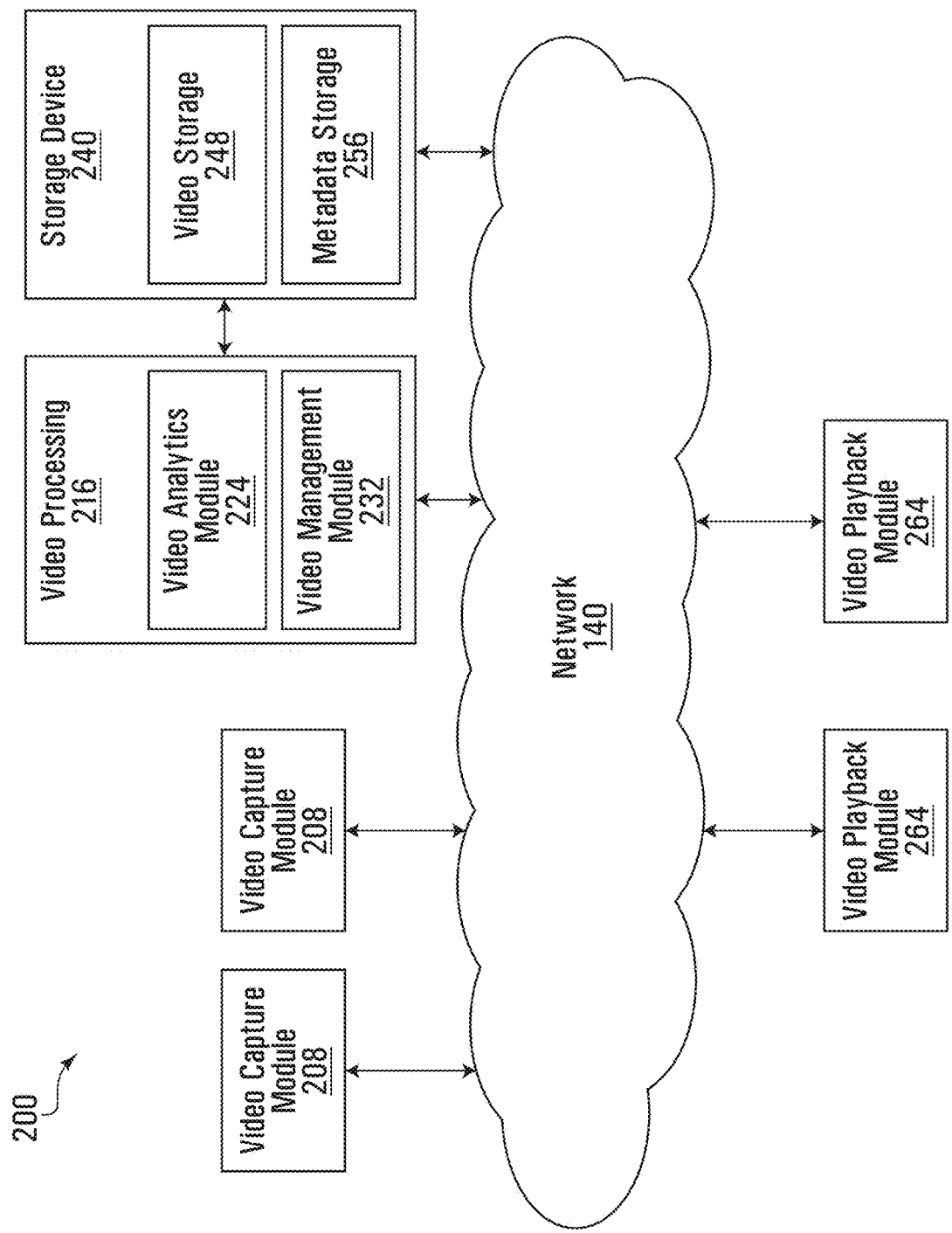
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
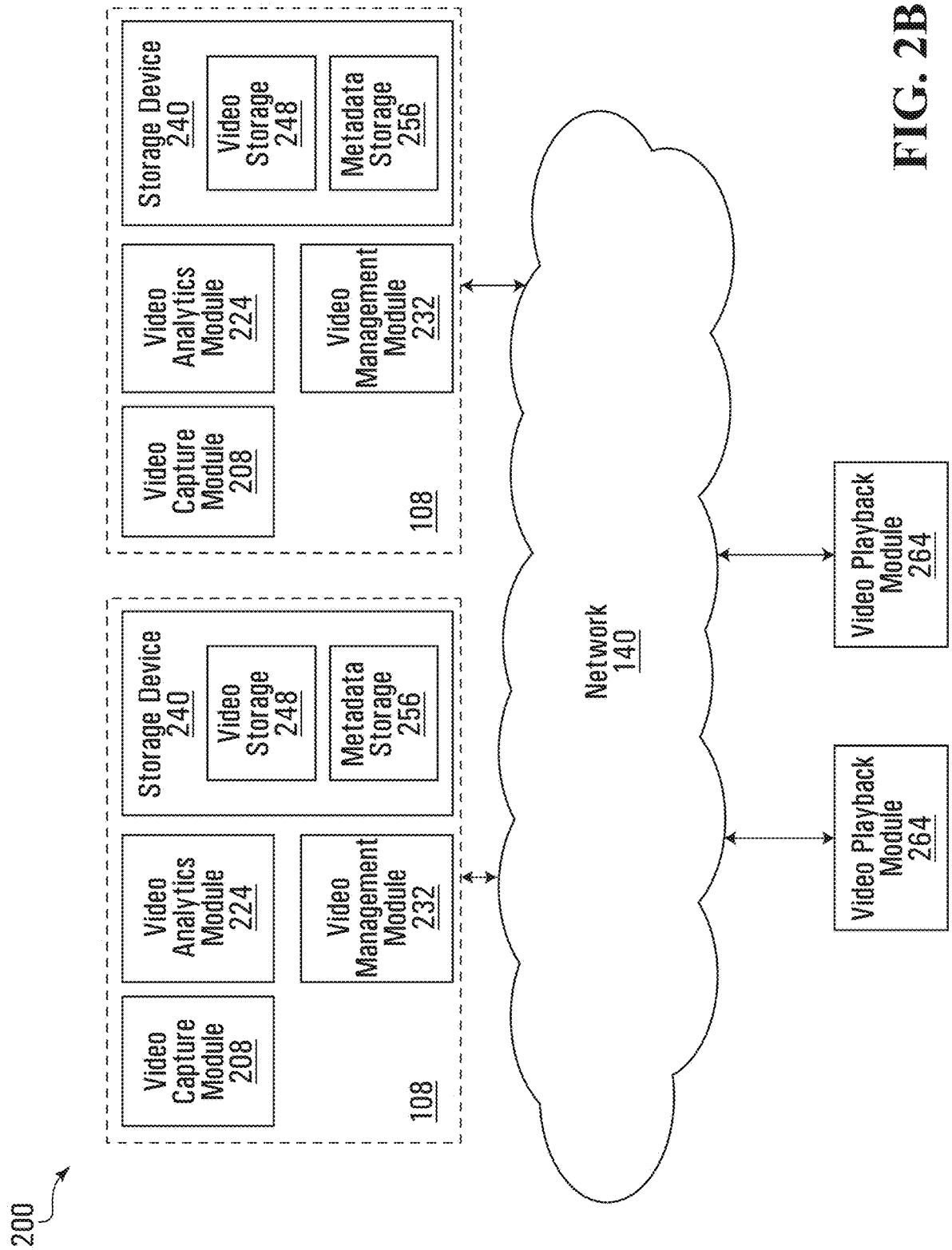
FIG. 2B illustrates a block diagram of a set of operational modules of the video capture and playback system according to one particular example embodiment wherein the video analytics module 224, the video management module 232 and the storage device 240 is wholly implemented on the one or more image capture devices 108.

Referring now to FIG. 2B, therein illustrated is a block diagram of a set 200 of operational modules of the video capture and playback system 100 according to one particular example embodiment wherein the video analytics module 224, the video management module 232 and the storage device 240 is wholly implemented on the one or more image capture devices 108. Alternatively, the video analytics module 224, the video management module 232 and the storage device 240 is wholly implemented on the processing appliance 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

Figure 3:
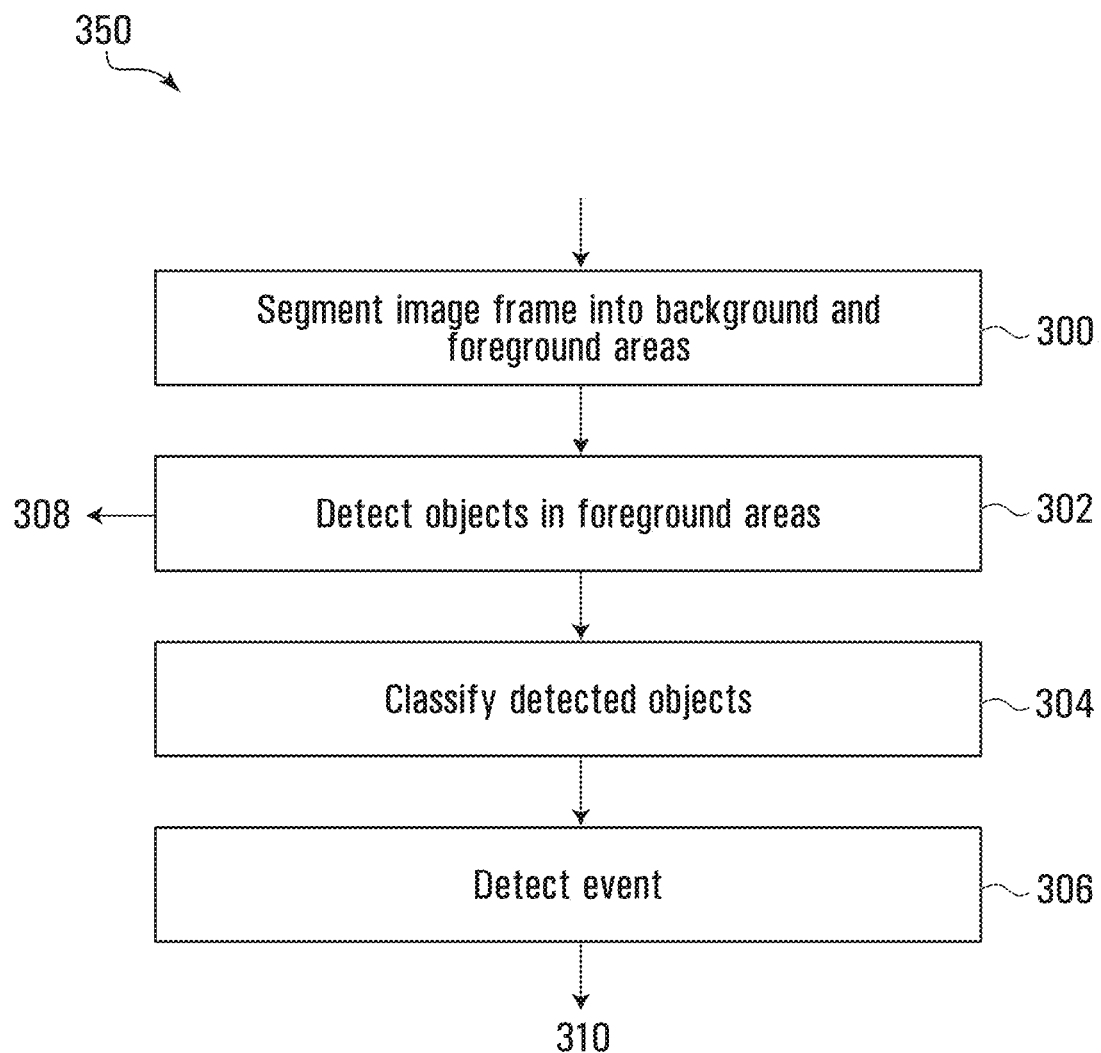
FIG. 3 illustrates a flow diagram of an example embodiment of a method for performing video analytics on one or more image frames of a video captured by a video capture device.

Referring now to FIG. 3, therein illustrated is a flow diagram of an example embodiment of a method 350 for performing video analytics on one or more image frames of a video captured by a video capture device 108. The video analytics is performed by the video analytics module 224 to determine properties or characteristics of the captured image or video and/or of visual objects found in the scene captured in the video.

At 300, at least one image frame of the video is segmented into foreground areas and background areas. The segmenting separates areas of the image frame corresponding to moving objects (or previously moving objects) in the captured scene from stationary areas of the scene.

At 302, one or more foreground visual objects in the scene represented by the image frame are detected based on the segmenting of 300. For example, any discrete contiguous foreground area or "blob" may be identified as a foreground visual object in the scene. For example, only contiguous foreground areas greater than a certain size (such as, for example, number of pixels) are identified as a foreground visual object in the scene.

Metadata may be further generated relating to the detected one or more foreground areas. The metadata may define the location, reference coordinates, of the foreground visual object, or object, within the image frame. For example, the location metadata may be further used to generate a bounding box (such as, for example, when encoding video or playing back video) outlining the detected foreground visual object. The image within the bounding box is extracted, called a cropped bounding box (also referred to as a "Chip"), for inclusion in metadata which along with the associated video may be processed further at other devices, such as workstation 156, on the network 140. In short, the cropped bounding box, or Chip, is a cropped portion of an image frame of the video containing the detected foreground visual object. The extracted image, which is the cropped bounding box, alternately may be smaller then what was in the bounding box or may be larger then what was in the bounding box. The size of the image being extracted, for example, should be close to, but outside of, the actual boundaries of the object that has been detected. The bounding boxes are typically rectangular in shape, but may also be irregular shapes which closely outline the objects. A bounding box may, for example, closely follow the boundaries (outline) of a human object.

In a further embodiment, the size of the extracted image is larger than the actual boundaries of the object that has been detected, herein called a Padded cropped bounding box (also referred to as a "Padded Chip"). The Padded cropped bounding box, for example, may be twice the area of the bounding box so that it includes, in whole or in part, objects close to, or overlapping, with the detected foreground visual object. For greater clarity, Padded cropped bounding boxes have larger images then cropped bounding boxes of images of objects within bounding boxes (herein called non-Padded cropped bounding boxes). For clarity, cropped bounding boxes as used herein includes Padded cropped bounding boxes and non-Padded cropped bounding boxes. It will be understood that the image size of the Padded cropped bounding box may vary in size from a little larger (for example 10% larger) to substantially larger (for example 1000% larger).

While the embodiments herein describe the Padded cropped bounding boxes as being expanded non-Padded cropped bounding boxes with extra pixels while still keeping reference coordinates of the original non-Padded cropped bounding box, the expansion or extra pixels may be added more in the horizontal axis instead of the vertical axis. Further, the expansion of extra pixels may be symmetrical or asymmetrical about an axis relative the object. The object of a non-Padded cropped bounding box may be centered in the Padded cropped bounding box as well as the non-Padded cropped bounding box, but some embodiments may off center such objects.

In some embodiments, the cropped bounding boxes, including the Padded cropped bounding boxes and the non-Padded cropped bounding boxes, may be reference coordinates of image frames of the video instead of actual extracted images of image frames of the video. The cropped bounding box images may then be extracted from the image frames when needed. Examples of images seen by camera 108, Padded cropped bounding boxes, and cropped bounding boxes derived from the Padded cropped bounding boxes sent to a video analytics module 224, which may for example, process the cropped bounding box on a server.

A visual indicator may be added to the image frame to visually identify each of the detected one or more foreground visual objects. The visual indicator may be a bounding box that surrounds each of the one or more foreground visual objects within the image frame.

In some example embodiments, the video analytics may further include, at 304, classifying the foreground visual objects (or objects) detected at 302. For example, pattern recognition may be carried out to classify the foreground visual objects. A foreground visual object may be classified by class, such as a person, a car or an animal. Additionally or alternatively, a visual object may be classified by action, such as movement and direction of movement of the visual object. Other classifiers may also be determined, such as color, size, orientation, etc. In more specific examples, classifying the visual object may include identifying a person based on facial detection and recognizing text, such as a license plate. Visual classification may be performed according to systems and methods described in co-owned U.S. Pat. No. 8,934,709, which is incorporated by reference herein in its entirety.

The video analytics may further include, at 306, detecting whether an event has occurred and the type of event. Detecting the event may be based on a comparison of the classification of one or more foreground visual objects with one or more predefined rules. The event may be an event in anomaly detection or business intelligence, such as whether a video tripwire has been triggered, the number of persons present in one area, whether an object in scene has been "left behind" or whether an object in the scene has been removed.

An example of the video analytics, at 306, may be set to detect only humans and, upon such detection, extract cropped bounding boxes of the human objects, with reference coordinates of each of the cropped bounding boxes, for inclusion in metadata, which along with the associated video may be processed 310 further at other devices, such as workstation 156 on the network 140.

Figure 4:
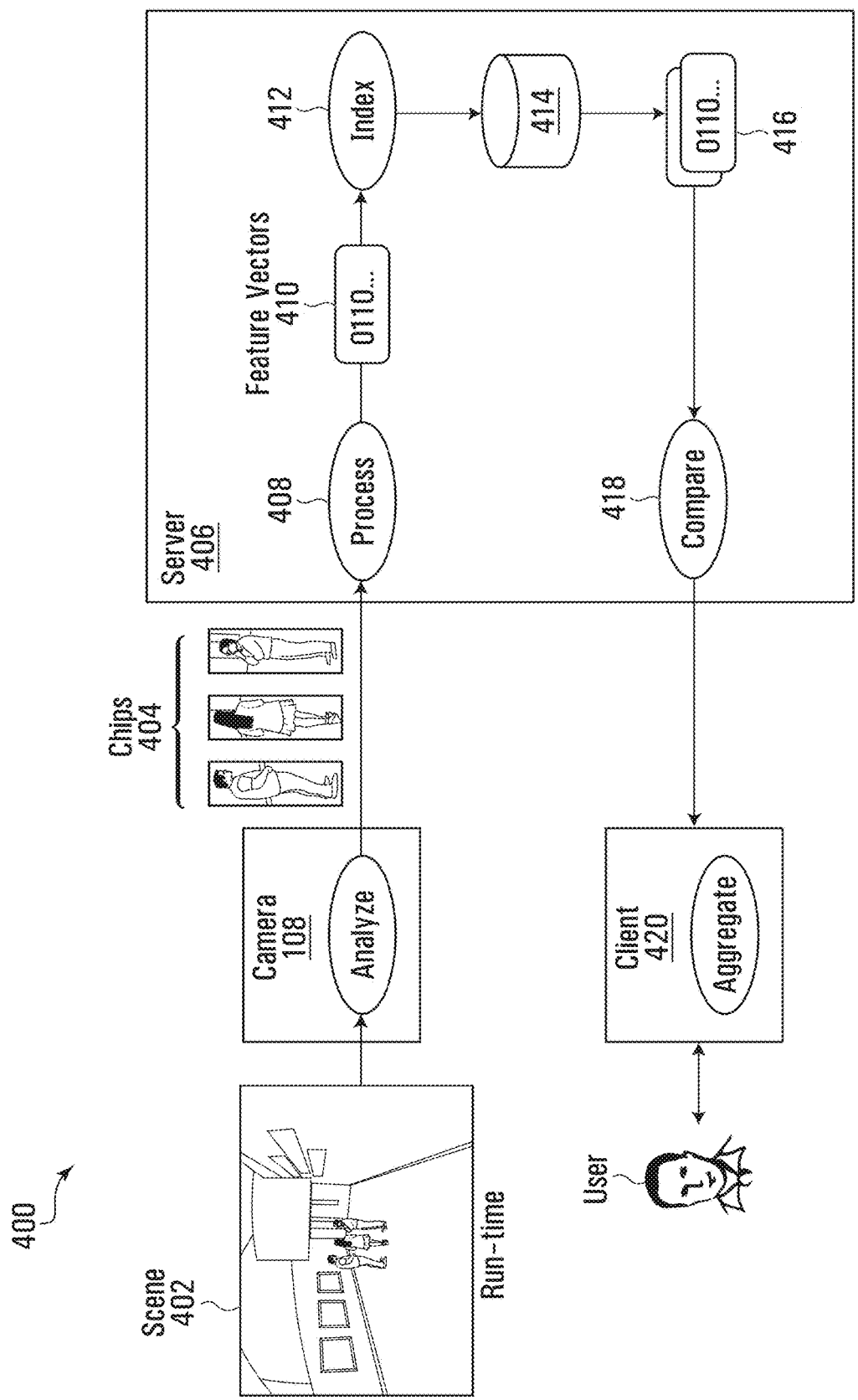
FIG. 4 illustrates a flow diagram of an example embodiment of a method for performing appearance matching to locate an object of interest on one or more image frames of a video captured by a video capture device (camera)

Referring now to FIG. 4, therein illustrated is a flow diagram of an example embodiment of a method 400 for performing appearance matching to locate an object of interest on one or more image frames of a video captured by a video capture device 108 (camera 108). The video is captured by the camera 108 over a period of time. The time could be over hours, days, or months and could be spread over several video files or segments. The meaning of "video" as used herein includes video files and video segments with associated metadata that have indications of time and identify which camera 108, in cases when there is more than one camera. The processing of the video is separated into multiple stages and distributed to optimize resource utilization and indexing for subsequent searching of objects (or persons) of interest. The video where such persons of interest are found in the search may then be reviewed by users.

Video of scene 402 is captured by the camera 108. The scene 402 is within the field of view of the camera 108. The video is processed by the video analytics module 224 in the camera 108 to produce metadata with cropped bounding boxes 404. The video analytics module 224 performs the object detection and classification, and also generates images (cropped bounding boxes) from the video that best represent the objects in the scene 402. In this example, the images of the objects, classified as people or humans, are extracted from the video and included in the metadata as cropped bounding boxes 404 for further identification processing. The metadata with the cropped bounding boxes 404 and the video are sent over the network 140 to a server 406. The server 406 may be the workstation 156 or a client device 164.

At the server 406, there are significantly more resources to further Process 408 the cropped bounding boxes 108 and generated Feature Vectors (or "Signatures" or "Binary Representations") 410 to represent the objects in the scene 402. The Process 408 is, for example, known in the art as a feature descriptor.

In computer vision, a feature descriptor is generally known as an algorithm that takes an image and outputs feature descriptions or feature vectors, via an image transformation. Feature descriptors encode information, i.e. an image, into a series of numbers to act as a numerical "fingerprint" that can be used to differentiate one feature from another. Ideally this information is invariant under image transformation so that the features could be found again in another image of the same object. Examples of feature descriptor algorithms are SIFT (Scale-invariant feature transform), HOG (histogram of oriented gradients), and SURF (Speeded Up Robust Features).

A feature vector is an n-dimensional vector of numerical features (numbers) that represent an image of an object that can be processed by computers. By comparing the feature vector of one image of one object with the feature vector of another image, a computer implementable process may determine whether the one image and the another image are images of the same object. The image signatures (or feature vectors, or embedding, or representation, etc.) are multi-dimensional vectors calculated by (for example convolutional) neural networks.

By calculating the Euclidean distance between the two feature vectors of the two images captured by the camera 108, a computer implementable process can determine a similarity score to indicate how similar the two images may be. The neural networks are trained in such manner that the feature vectors they compute for images are close (low Euclidian distance) for similar images and far (high Euclidian distance) for dissimilar images. In order to retrieve relevant images, the feature vector of the query image is compared with the feature vectors of the images in the database 414. The search results may be shown by ascending order of their distance (value between 0 and 1) to the query image. The similarity score may, for example, be a percentage as converted from the value between 0 and 1.

In this example implementation, the Process 408 uses a learning machine to process the cropped bounding boxes 404 to generate the feature vectors or signatures of the images of the objects captured in the video. The learning machine is for example a neural network such as a convolutional neural network (CNN) running on a graphics processing unit (GPU). The CNN may be trained using training datasets containing millions of pairs of similar and dissimilar images. The CNN, for example, is a Siamese network architecture trained with a contrastive loss function to train the neural networks. An example of a Siamese network is described in Bromley, Jane, et al. "Signature verification using a "Siamese" time delay neural network." International Journal of Pattern Recognition and Artificial Intelligence 7.04 (1993): 669-688, the contents of which is hereby incorporated by reference in its entirety.

The Process 408 deploys a trained model in what is known as batch learning where all of the training is done before it is used in the appearance search system. The trained model, in this embodiment, is a convolutional neural network learning model with one possible set of parameters. There is an infinity of possible sets of parameters for a given learning model. Optimization methods (such as stochastic gradient descent), and numerical gradient computation methods (such as Backpropagation) may be used to find the set of parameters that minimize our objective function (AKA loss function). Contrastive loss function is used as the objective function. This function is defined such that it takes high values when it the current trained model is less accurate (assigns high distance to similar pairs, or low distance to dissimilar pairs), and low values when the current trained model is more accurate (assigns low distance to similar pairs, and high distance to dissimilar pairs). The training process is thus reduced to a minimization problem. The process of finding the most accurate model is the training process, the resulting model with the set of parameters is the trained model and the set of parameters is not changed once it is deployed onto the appearance search system.

An alternate embodiment for Process 408 is to deploy a learning machine using what is known as online machine learning algorithms. The learning machine would be deployed in Process 408 with an initial set of parameters, however, the appearance search system will keep updating the parameters of the model based on some source of truth (for example, user feedback in the selection of the images of the objects of interest). Such learning machines also include other types of neural networks as well as convolutional neural networks.

The cropped bounding boxes 404 of human objects are processed by the Process 408 to generate Feature Vectors 410. The Feature Vectors 410 are Indexed 412 and stored in a database 414 with the video. The Feature Vectors 410 are also associated with reference coordinates to where the cropped bounding boxes 404 of the human objects may be located in the video. The database 414 storage includes storing the video with time stamps and camera identification as well as the associated metadata with the Feature Vectors 410 of the cropped bounding boxes 404 and reference coordinates to where in the video the cropped bounding boxes 404 are located.

To locate a particular person in the video, a feature vector of the person of interest is generated. Feature Vectors 416 which are similar to the feature vector of the person of interest are extracted from the database 414. The extracted Feature Vectors 416 are compared 418 to a threshold similarity score and those exceeding the threshold are provided to a client 420 for presentation to a user. The client 420 also has the video playback module 264 for the user to view the video associated with the extracted Feature Vectors 416.

In greater detail, the trained model is trained with a pre-defined distance function used to compare the computed feature vectors. The same distance function is used when the trained model is deployed in the appearance search system. The distance function is the Euclidian distance between the feature vectors where the feature vectors are normalized to have unit norms, and thus all feature vectors lie on a unit-norm hypersphere. After computing and storing the feature vectors of the detected objects in the database, searching similar objects is done using an exact nearest neighbor search: exhaustively evaluating the distance from the queried feature vector (feature vector of the object of interest) to all other vectors in the time frame of interest. The search results are returned ranked by descending order of their distance to the queried feature vector.

In an alternate embodiment, an approximate nearest neighbor search may be used. It is similar to its 'exact' counterpart, but it retrieves the most likely similar results without looking at all results. This is faster, but may introduce false negatives. An example of approximate nearest neighbor may use an indexing of a hashing of the feature vectors. An approximate nearest neighbor search may be faster where the number of feature vectors is large such as when the search time frames are long.

For greater certainty, it is understood that an "object of interest" includes a "person of interest" and that a "person of interest" includes an "object of interest".

Figure 5:
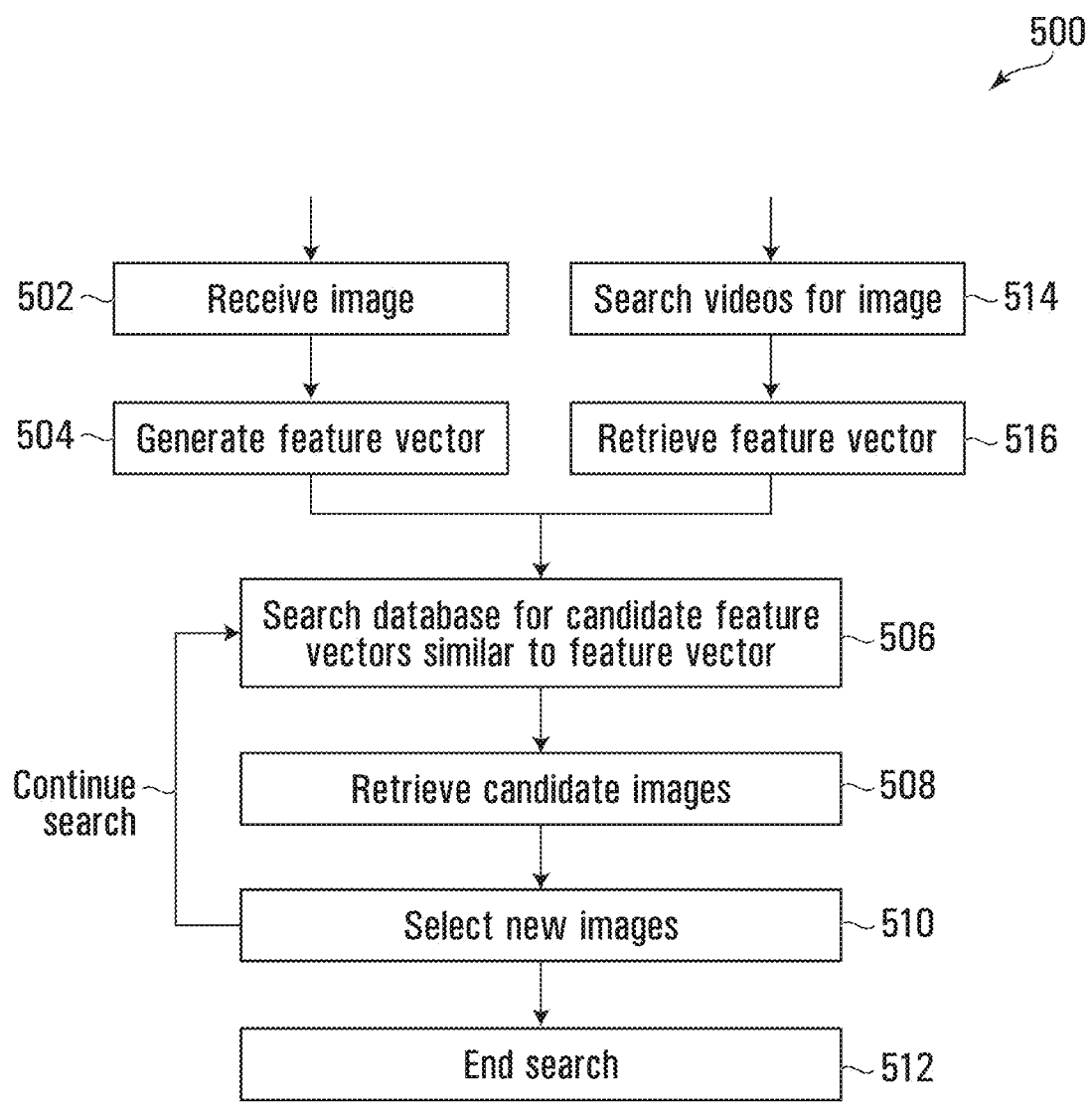
FIG. 5 illustrates a flow diagram of the example embodiment of FIG. 4 showing details of Appearance Search for performing appearance matching at the client to locate recorded videos of an object of interest.

Referring now to FIG. 5, therein illustrated is a flow diagram of the example embodiment of FIG. 4 showing details of Appearance Search 500 for performing appearance matching at the client 420 to locate recorded videos of an object of interest. To initiate an appearance search for an object of interest, a feature vector of the object of interest is needed in order to search the database 414 for similar feature vectors. In Appearance Search 500, there is illustrated two example methods of initiating an appearance search.

In the first method of initiating Appearance Search 500, an image of an object of interest is received 502 at the client 420 where it is sent to the Process 408 to generate 504 a feature vector of the object of interest. In the second method, the user searches 514 the database 414 for an image of the object of interest and retrieves 516 the feature vector of the object of interest which was previously generated when the video was processed for storage in the database 414.

From either the first method or the second method, a search 506 is then made of the database 414 for candidate feature vectors that have a similarity score, as compared with the feature vector of the object of interest, beyond a threshold, which for example could be 70%. The images of the candidate feature vectors are received 508 and then presented at the client 420 for the user to select 510 the images of the candidate features vectors which are or may be of the object of interest. The client 420 tracks the selected images in a list. The list having the images which have been selected by the user as being of the object of interest. Optionally, the user at selection 510 may also remove images, which images have been selected by the user, from the list which were subsequently thought to be incorrect.

With each selection of a new image (or images) of the object of interest at selection 510, the feature vectors of the new images is searched 506 at the database 414 and new candidate images of the object of interest are presented at the client 420 for the user to again select 510 new images which are or may be of the object of interest. This searching loop of Appearance Search 500 may continue until the user decides enough images of the object of interest has been located and ends the search 512. The user may then, for example, view or download the videos associated with the images on the list.

Figure 6:
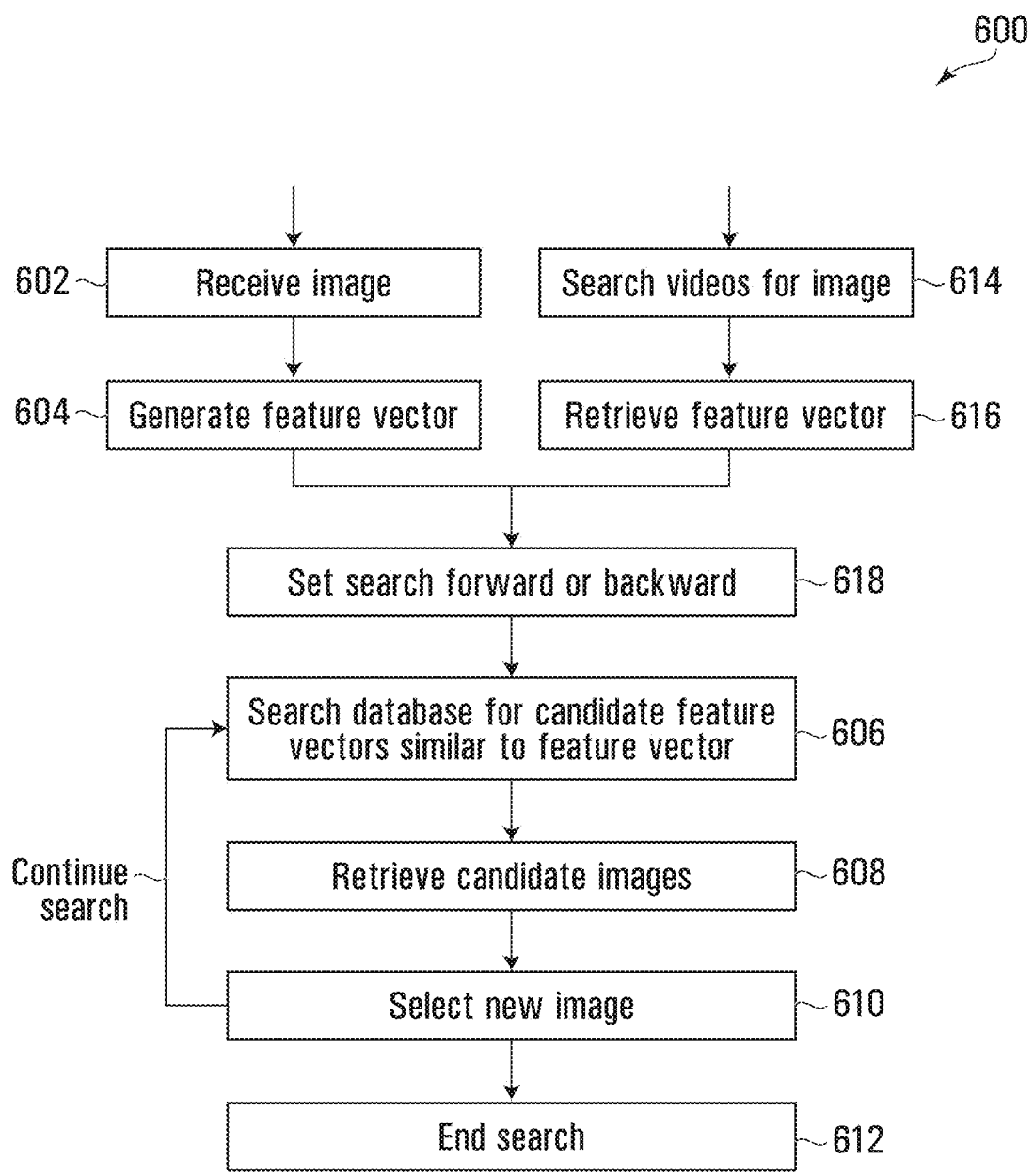
FIG. 6 illustrates a flow diagram of the example embodiment of FIG. 4 showing details of Timed Appearance Search for performing appearance matching at the client 420 to locate recorded videos of an object of interest either before or after a selected time.

Referring now to FIG. 6, therein illustrated is a flow diagram of the example embodiment of FIG. 4 showing details of Timed Appearance Search 600 for performing appearance matching at the client 420 to locate recorded videos of an object of interest either before or after a selected time. This type of search is useful for locating for example a lost bag by locating images closer to the current time and back tracking in time to locate who may have left a bag unattended.

To initial an appearance search for an object of interest, a feature vector of the object of interest is needed in order to search the database 414 for similar feature vectors. In Timed Appearance Search 600, like Appearance Search 500; there are illustrated two example methods for initiating a timed appearance search. In the first method of initiating Appearance Search 600, an image of an object of interest is received 602 at the client 420 where it is sent to the Process 408 to generate 604 a feature vector of the object of interest. In the second method, the user searches 614 the database 414 for an image of the object of interest and retrieves 616 the feature vector of the object of interest which was previously generated when the video was processed before storage in the database 414.

From either the first method or the second method, the Timed Appearance Search 600 is set 618 to search either forward or backward in time. With the first method, a search time may be manually set by the user. With the second method, the search start time is set at the time at which the image was captured by the camera 108. In this example, Timed Appearance Search 600 is set to search forward in time in order to locate for example a lost child closer to the current time. In another example, Timed Appearance Search 600 may be set to search backward in time when the user wishes for instance to determine who may have left a bag (the object of interest) unattended.

A search 606 is then made of the database 414, forward in time from the search time, for candidate feature vectors that have a similarity score, as compared with the feature vector of the object of interest, beyond a threshold, which for example could be 80%. The images of the candidate feature vectors are received 608 and then presented at the client 420 for the user to select 610 one image from the images of the candidate feature vectors which is or may be of the object of interest. The client 420 tracks the selected images in a list. The list comprises the images which have been selected by the user as being of the object of interest. Optionally, the user at selection 610 may also remove images, which images have been selected by the user, from the list which were subsequently thought to be incorrect.

With each selection of a new image of the object of interest at selection 610, the feature vector of the new images is searched 606, forward in time from the search time, at the database 414. The search time is the time at which the new image was captured by the camera 108. The new candidate images of the object of interest are presented at the client 420 for the user to again select 610 another new image which are or may be of the object of interest. This searching loop of the Timed Appearance Search 600 may continue until the user decides enough images of the object of interest have been located and ends the search 612. The user may then, for example, view or download the videos associated with the images on the list. While this example is for a search forward in time, a search backward in time is accordingly similar except the searches of the database 414 are filtered for hits that are backward, or which occurred before, the search time.

Figure 7:
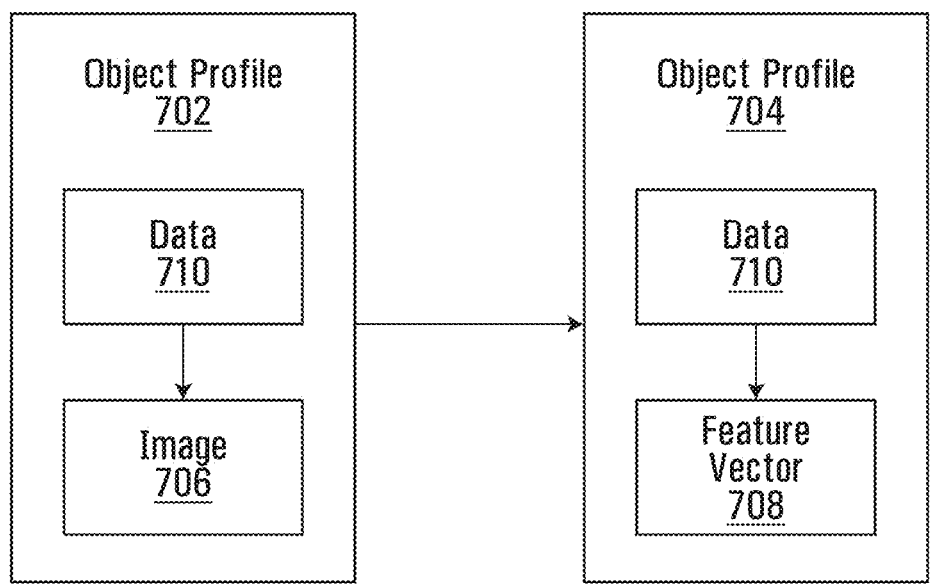
FIG. 7 illustrates block diagrams of example metadata of an Object Profile before storage and the reduced in size Object Profile for storage.

Referring now to FIG. 7, therein illustrated are block diagrams of an example metadata of an Object Profile 702 with cropped bounding box 404 as sent by the camera 108 to server 406 and an example of the Object Profile 704 with the image 706 (cropped bounding box 404) replaced by the feature vector 708 of the cropped bounding box 404 for storage in the database 414. By storing the Object Profile 704 with the feature vector 708 instead of the image 706, some storage space can be saved as the image 706 file size is bigger than the feature vector 708 file size. As a result, significant savings in data storage can be achieved, since the cropped bounding boxes can often be quite large and numerous.

The Data 710 in Object Profile 702 and Object Profile 704 has, for example, content including time stamp, frame number, resolution in pixels by width and height of the scene, segmentation mask of this frame by width and height in pixels and stride by row width in bytes, classification (person, vehicle, other), confidence by percent of the classification, box (bounding box surrounding the profiled object) by width and height in normalized sensor coordinates, image width and height in pixels as well as image stride (row width in bytes), segmentation mask of image, orientation, and x & y coordinates of the image box. The feature vector 708 is a binary representation (binary in the sense of being composed of zeros and ones) of the image 706 with, for example, 48 dimensions: 48 floating point numbers. The number of dimensions may be larger or smaller depending on the learning machine being used to generate the feature vectors. While higher dimensions generally have greater accuracy, the computational resources required may also be very high.

The cropped bounding box 404 or image 706 can be re-extracted from the recorded video using reference coordinates, thus the cropped bounding box 404 does not have to be saved in addition to the video. The reference coordinates may, for example, include time stamp, frame number, and box. As an example, the reference coordinates are just the time stamp with the associated video file where time stamp has sufficient accuracy to back track to the original image frame, and where the time stamp does not have sufficient accuracy to trace back to the original image frame, an image frame close to the original image frame may be good enough as image frames close in time in a video are generally very similar.

While this example embodiment has the Object Profile 704 replacing a feature vector with an image, other embodiments may have the image being compressed using conventional methods.

Figure 8:
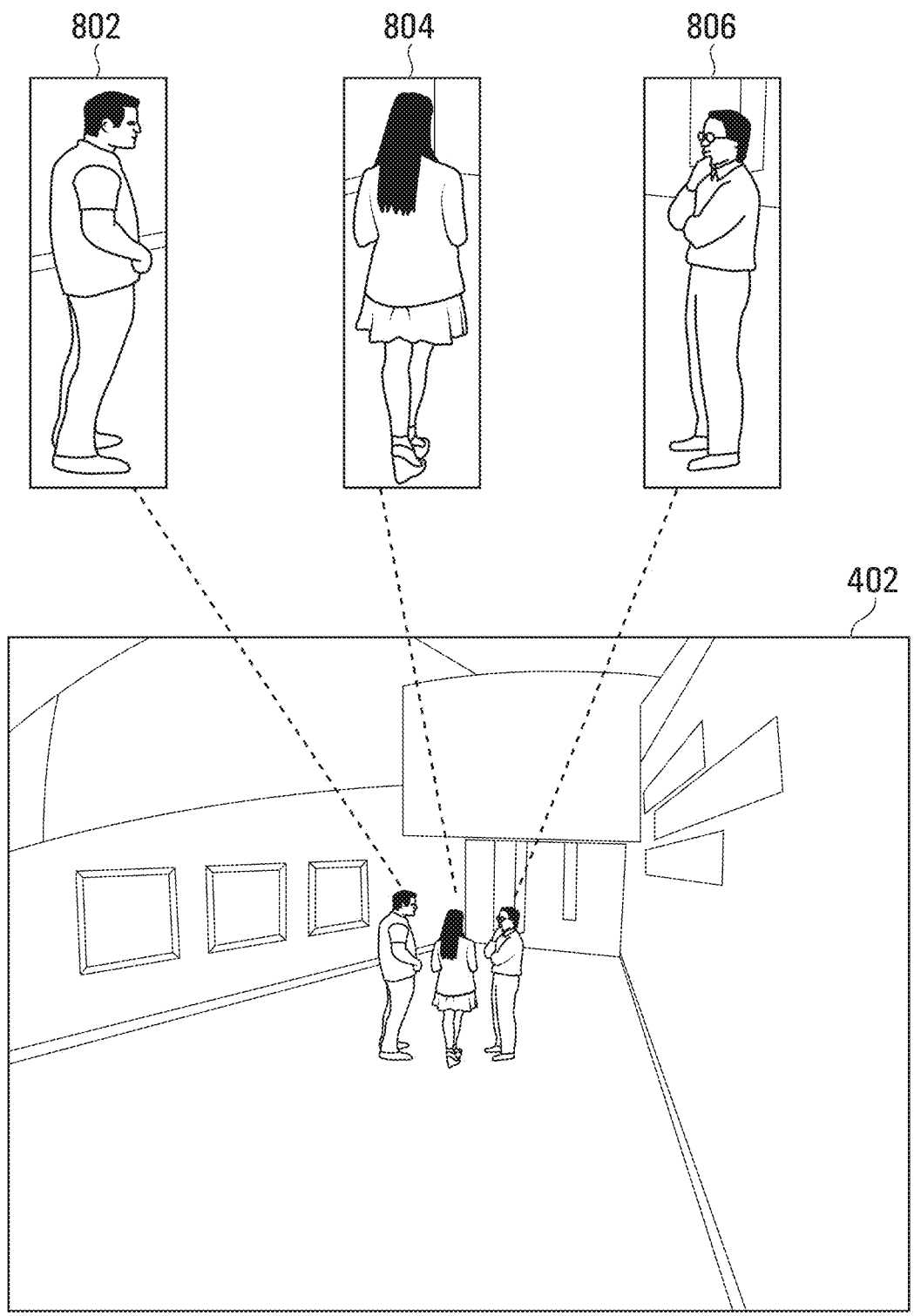
FIG. 8 illustrates the scene and the cropped bounding boxes of the example embodiment of FIG. 4.

Referring now to FIG. 8, therein is illustrated the scene 402 and the cropped bounding boxes 404 of the example embodiment of FIG. 4. There are shown in the scene 402 the three people who are detected. Their images 802, 806, 808 are extracted by the camera 108 and sent to the server 406 as the cropped bounding boxes 404. The images 802, 806, 808 are the representative images of the three people in the video over a period of time. The three people in the video are in motion and their captured images will accordingly be different over a given period of time. To filter the images to a manageable number, a representative image (or images) is selected as the cropped bounding boxes 404 for further processing.

Figure 9:
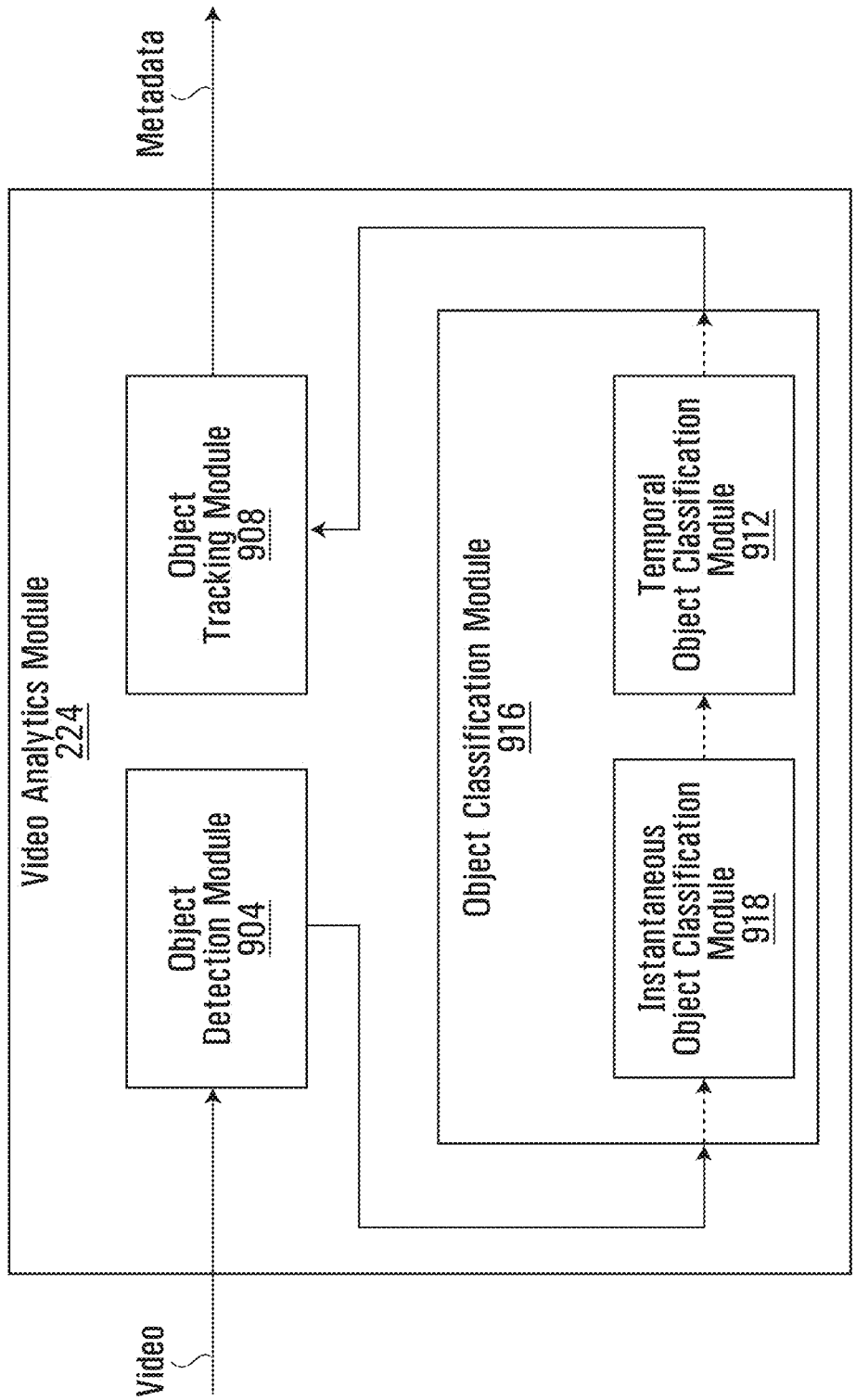
FIG. 9 illustrates a block diagram of a set of operational sub-modules of the video analytics module according to one example embodiment.

Referring now to FIG. 9, therein illustrated is a block diagram of a set of operational sub-modules of the video analytics module 224 according to one example embodiment. The video analytics module 224 includes a number of modules for performing various tasks. For example, the video analytics module 224 includes an object detection module 904 for detecting objects appearing in the field of view of the video capturing device 108. The object detection module 904 may employ any known object detection method such as motion detection and blob detection, for example. The object detection module 904 may include the systems and use the detection methods described in U.S. Pat. No. 7,627,171 entitled "Methods and Systems for Detecting Objects of Interest in Spatio-Temporal Signals," the entire contents of which is incorporated herein by reference.

The video analytics module 224 also includes an object tracking module 908 connected or coupled to the object detection module 904. The object tracking module 908 is operable to temporally associate instances of an object detected by the object detection module 908. The object tracking module 908 may include the systems and use the methods described in U.S. Pat. No. 8,224,029 entitled "Object Matching for Tracking, Indexing, and Search," the entire contents of which is incorporated herein by reference. The object tracking module 908 generates metadata corresponding to visual objects it tracks. The metadata may correspond to signatures of the visual object representing the object's appearance or other features. The metadata is transmitted to the server 406 for processing.

The video analytics module 224 also includes an object classification module 916 which classifies detected objects from the object detection module 904 and connects to the object tracking module 908. The object classification module 916 may include internally, an instantaneous object classification module 918 and a temporal object classification module 912. The instantaneous object classification module 918 determines a visual object's type (such as, for example, human, vehicle, or animal) based upon a single instance of the object. The input to the instantaneous object classification module 916 is preferably a sub-region (for example within a bounding box) of an image in which the visual object of interest is located rather than the entire image frame. A benefit of inputting a sub-region of the image frame to the classification module 916 is that the whole scene need not be analyzed for classification, thereby requiring less processing power. The video analytics module 224 may, for example, filter out all object types except human for further processing.

The temporal object classification module 912 may also maintains class (such as, for example, human, vehicle, or animal) information of an object over a period of time. The temporal object classification module 912 averages the instantaneous class information of the object provided by the instantaneous object classification module 918 over a period of time during the lifetime of the object. In other words, the temporal object classification module 912 determines the objects type based on its appearance in multiple frames. For example, gait analysis of the way a person walks can be useful to classify a person, or analysis of a person's legs can be useful to classify a cyclist. The temporal object classification module 912 may combine information regarding the trajectory of an object (such as, for example, whether the trajectory is smooth or chaotic, or whether the object is moving or motionless) and confidence information of the classifications made by the instantaneous object classification module 918 averaged over multiple frames. For example, classification confidence values determined by the object classification module 916 may be adjusted based on the smoothness of trajectory of the object. The temporal object classification module 912 may assign an object to an unknown class until the visual object is classified by the instantaneous object classification module 918 a sufficient number of times and a predetermined number of statistics have been gathered. In classifying an object, the temporal object classification module 912 may also take into account how long the object has been in the field of view. The temporal object classification module 912 may make a final determination about the class of an object based on the information described above. The temporal object classification module 912 may also use a hysteresis approach for changing the class of an object. More specifically, a threshold may be set for transitioning the classification of an object from unknown to a definite class, and that threshold may be larger than a threshold for the opposite transition (such as, for example, from a human to unknown). The object classification module 916 may generate metadata related to the class of an object, and the metadata may be stored in the database 414. The temporal object classification module 912 may aggregate the classifications made by the instantaneous object classification module 918.

In an alternative arrangement, the object classification module 916 is placed after the object detection module 904 and before the object tracking module 908 so that object classification occurs before object tracking. In another alternative arrangement, the object detection, tracking, temporal classification, and classification modules 904, 908, 912, and 916 are interrelated as described above. In a further alternative embodiment, the video analytics module 224 may use facial recognition (as is known in the art) to detect faces in the images of humans and accordingly provides confidence levels. The appearance search system of such an embodiment may include using feature vectors of the images or cropped bounding boxes of the faces instead of the whole human as shown in FIG. 8. Such facial feature vectors may be used alone or in conjunction with feature vectors of the whole object. Further, feature vectors of parts of objects may similarly be used alone or in conjunction with feature vectors of the whole object. For example, a part of an object may be an image of an ear of a human. Ear recognition to identify individuals is known in the art.

In each image frame of a video, the video analytics module 224 detects the objects and extracts the images of each object. An image selected from these images is referred to as a finalization of the object. The finalizations of the objects are intended to select the best representation of the visual appearance of each object during its lifetime in the scene. A finalization is used to extract a signature/feature vector which can further be used to query other finalizations to retrieve the closest match in an appearance search setting.

The finalization of the object can ideally be generated on every single frame of the object's lifetime. If this is done, then the computation requirements may be too high for appearance search to be currently practical as there are many image frames in even one second of video. The following is an example of filtering of possible finalizations, or the selection of an image from possible images, of an object to represent the object over a period of time in order to reduce computational requirements.

As an Object (a human) enters the scene 402, it is detected by the object detection module 904 as an object. The object classification module 916 would then classify the Object as a human or person with a confidence level for the object to be a human. The Object is tracked in the scene 402 by the object tracking module 908 through each of the image frames of the video captured by the camera 108. The Object may also be identified by a track number as it is being tracked.

In each image frame, an image of the Object within a bounding box surrounding the Object is extracted from the image frame and the image is a cropped bounding box. The object classification module 916 provides a confidence level for the Object as being a human for each image frame, for example. As a further exemplary embodiment, where the object classification module 916 provides a relatively low confidence level for the classification of the Object as being a human (for example) then a Padded cropped bounding box is extracted so that a more computational intensive object detection and classification module (for example Process 408) at a server resolves the Object Padded cropped bounding box before the feature vector is generated. The more computational intensive object detection and classification module may be another neural network to resolve or extract the Object from another overlapping or closely adjacent object. A relatively low confidence level (for example 50%) may also be used to indicate which cropped bounding boxes or Padded cropped bounding boxes should be further processed to resolve issues, such as other objects within the bounding box, before the feature vector is generated. The video analytics module 224 keeps a list of a certain number of cropped bounding boxes, for example the top 10 cropped bounding boxes with highest confidence levels as the Object is tracked in the scene 402. When the object tracking module 908 loses track of the Object or when the Object exits the scene, the cropped bounding box 404 is selected from the list of 10 cropped bounding boxes which shows the Object with the largest number of foreground pixels (or object pixels). The cropped bounding box 404 is sent with the metadata to the server 406 for further processing. The cropped bounding box 404 represents the image of the Object over this tracked period of time. The confidence levels are used to reject cropped bounding boxes which may not represent a good picture of the Object such as when the Object crosses a shadow. Alternatively, more than one cropped bounding box may be picked from the list of top 10 cropped bounding boxes for sending to the server 406. For example, another cropped bounding box selected by the highest confidence level may be sent as well.

The list of the top 10 cropped bounding boxes is one implementation. Alternatively, the list could be only 5 cropped bounding boxes or 20 cropped bounding boxes as further examples. Further, the selection of a cropped bounding box for sending as the cropped bounding box 404 from the list of cropped bounding boxes may occur periodically instead of just after the loss of tracking. Alternatively, the cropped bounding box selection from the list may be based on the highest confidence level instead of on the largest number of object pixels. Alternatively, the video analytics module 224 may be located at the server 406 (the workstation 156), the processing appliance 148, the client device 164, or at other devices off the camera.

The cropped bounding box selection criterion mentioned above are possible solutions to the problem of representing an objects lifetime by a single cropped bounding box. Below is another selection criteria.

Alternatively, filtration of the top 10 of n cropped bounding boxes can be performed by using the information provided by a height estimation algorithm of the object classification module 916. The height estimation module creates a homology matrix based on head (top) and foot (bottom) locations observed over a period of time. The period of learning the homology is hereby referred to as a learning phase. The resulting homology is further used to estimate the height of a true object appearing at a particular location and is compared with the observed height of an object at that location. Once the learning is complete, the information provided by the height estimation module can be used to filter out cropped bounding boxes in the top n list by comparing the heights of the cropped bounding boxes with the expected height of an object at the location where the cropped bounding box was captured. This filtering method is intended to be a rejection criterion of cropped bounding boxes which may be false positives with high confidence reported by the object classification module 916. The resulting filtered cropped bounding boxes can then be further ranked by the number of foreground pixels captured by the object. This multi-stage filtration criteria ensures that not only does the finalization of the object have high classification confidence, but is also conformant to the dimensions of the expected object at its location and furthermore, also has a good number of foreground pixels as reported by the object detection module 904. The resulting cropped bounding box from the multi-stage filtration criteria may better represent the appearance of the object during its lifetime in the frame as compared to a cropped bounding box that results from any of the above mentioned criteria applied singularly. The machine learning module herein includes machine learning algorithms as is known in the art.

Figure 10A:
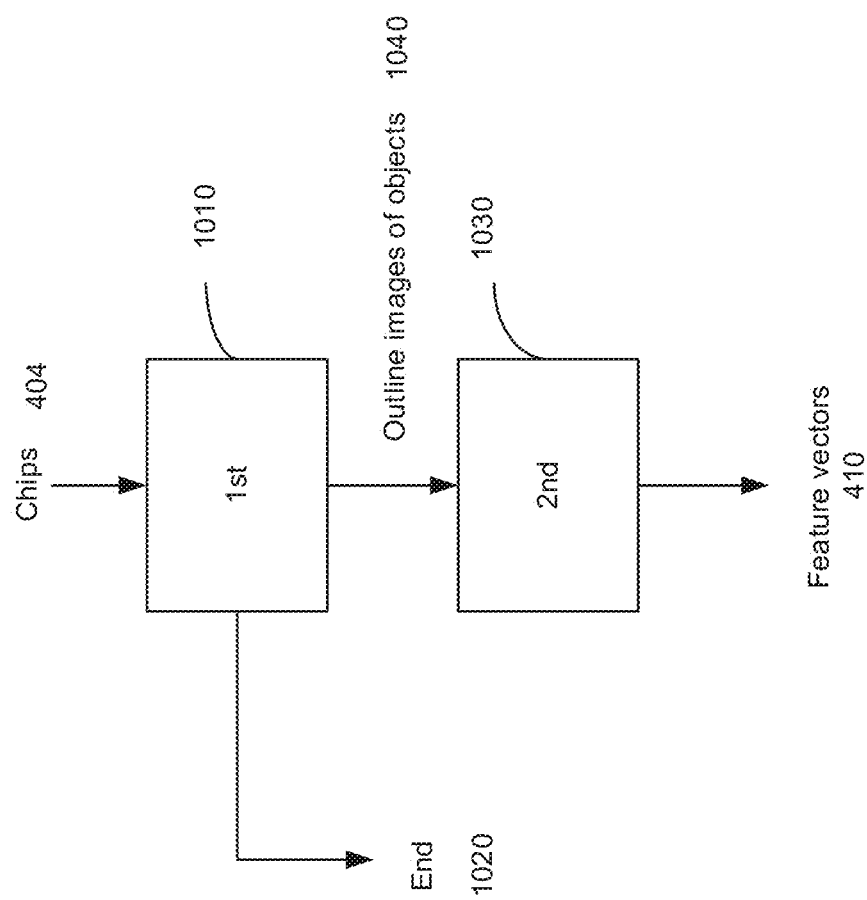
FIG. 10A illustrates a block diagram of a process for generating feature vectors according to one example embodiment.

Referring now to FIG. 10A, therein illustrated is a block diagram of Process 408 of FIG. 4 according to another example embodiment. Images of objects (cropped bounding boxes, including Padded cropped bounding boxes) 404 are received by the Process 408 where it is processed by a first neural network 1010 to detect, classify, and outline objects in the cropped bounding boxes 404. The first neural network 1010 and second neural network 1030 are, for example, convolutional neural networks. The first neural network 1010, for example, detects zero, one, two, or more humans (as classified) for a given cropped bounding box of the Clips 404. If zero then it means no human objects were detected and the initial classification (at the Camera 108) was incorrect and that a feature vector 410 should not be generated for the give cropped bounding box (End 1020). If one human object is detected then the given cropped bounding box should be processed further. Where the given cropped bounding box is a Padded cropped bounding box, the image of the object of the given cropped bounding box is, optionally, reduced in size to be within the bounding box of the object as with other non-Padded cropped bounding boxes. If two or more (2+) human object are detected in a given cropped bounding box then, in this embodiment, the image of the object closest to the co-ordinates of the center (or closest to the center) of the "object" in the image frame is extracted from the image frame for a new cropped bounding box to replace the given cropped bounding box in the cropped bounding boxes 404 for further processing.

The first neural network 1010 outputs outlined images of objects (cropped bounding boxes) 1040 for processing by the second neural network 1030 to generate feature vectors 410 to associate with the cropped bounding boxes 404. An example first neural network 1010 is a single shot multibox detector (SSD) as known in the art.

Figure 10B:
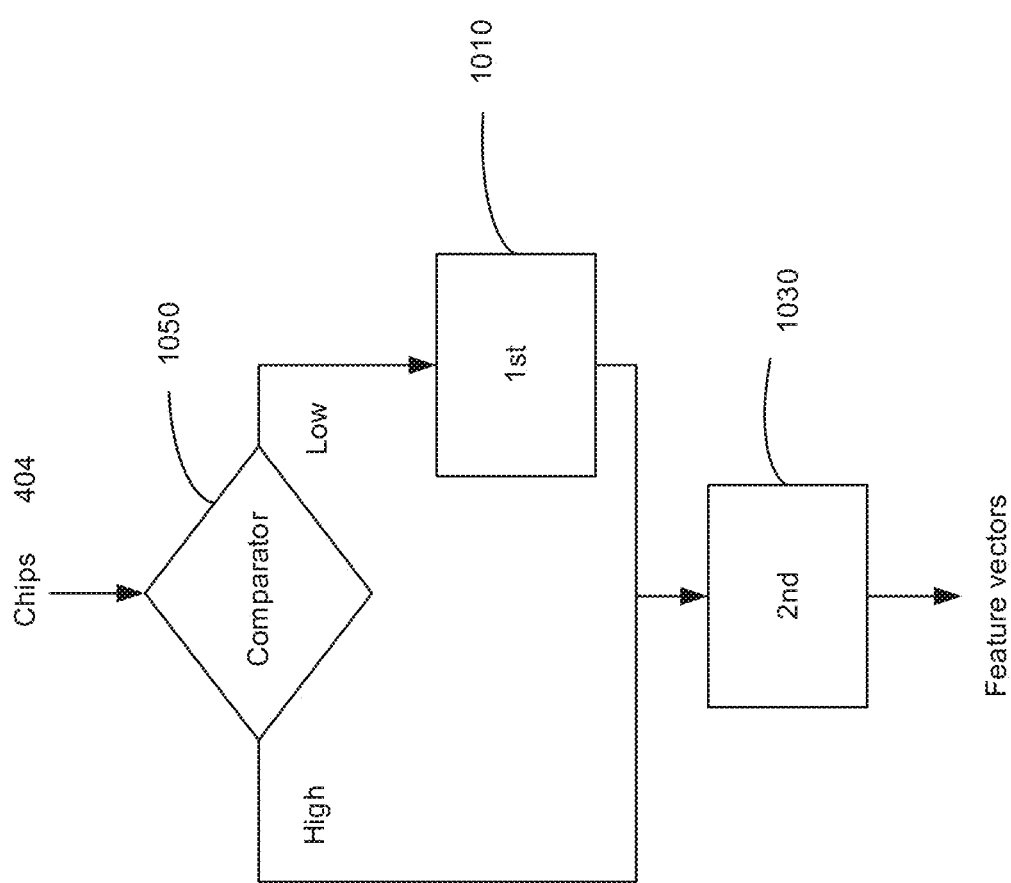
FIG. 10B illustrates a block diagram of an alternative process for generating feature vectors according to an alternative example embodiment.

Referring now to FIG. 10B, therein illustrated is a block diagram of Process 408 of FIG. 4 according to a further example embodiment. Images of objects (cropped bounding boxes including Padded cropped bounding boxes) 404 are received by the Process 408 where a comparator 1050 determines the confidence level associated with the cropped bounding boxes 404. The cropped bounding boxes 404 from the Camera 108 have associated metadata (such as confidence level) as determined by a video analytics module at the Camera 108.

Where the confidence level of a given cropped bounding box is relatively low (for example at under 50%), the given cropped bounding box is processed according to the embodiment in FIG. 10A starting with the first neural network 1010 and ending with the feature vector 410. Where the confidence level of a given cropped bounding box is relatively high (for example at 50% and over), the given cropped bounding box is processed directly by the second neural network 1030 and bypassing the first neural network 1010 to generate the feature vector 410.

The embodiments describing extracting a Padded cropped bounding box at the camera 108 include extracting all images of objects as Padded cropped bounding boxes while other embodiments only extract Padded cropped bounding boxes when the confidence level is relatively low for the associated classified objects. It is noted that the first neural network 1010 may process both Padded and non-Padded cropped bounding boxes for better accuracy and some implementations may have the first neural network process all cropped bounding boxes where computational resources are available. While the first neural network 1010 may process all Padded cropped bounding boxes, it may also process a portion of the non-Padded cropped bounding boxes which have lower confidence levels. The threshold confidence level set by the Comparator 1050 may be lower than the threshold confidence level set for extracting Padded cropped bounding boxes at the camera 108. In some embodiments, some of the Padded cropped bounding boxes may also skip processing by the first neural network 1010 and go directly to the second neural network 1030 especially when computational resources are tied up with other functions on the server 406. Thus, the number of cropped bounding boxes processed by the first neural network may be set depending the amount of computational resources available at the server 406.

Figure 11:
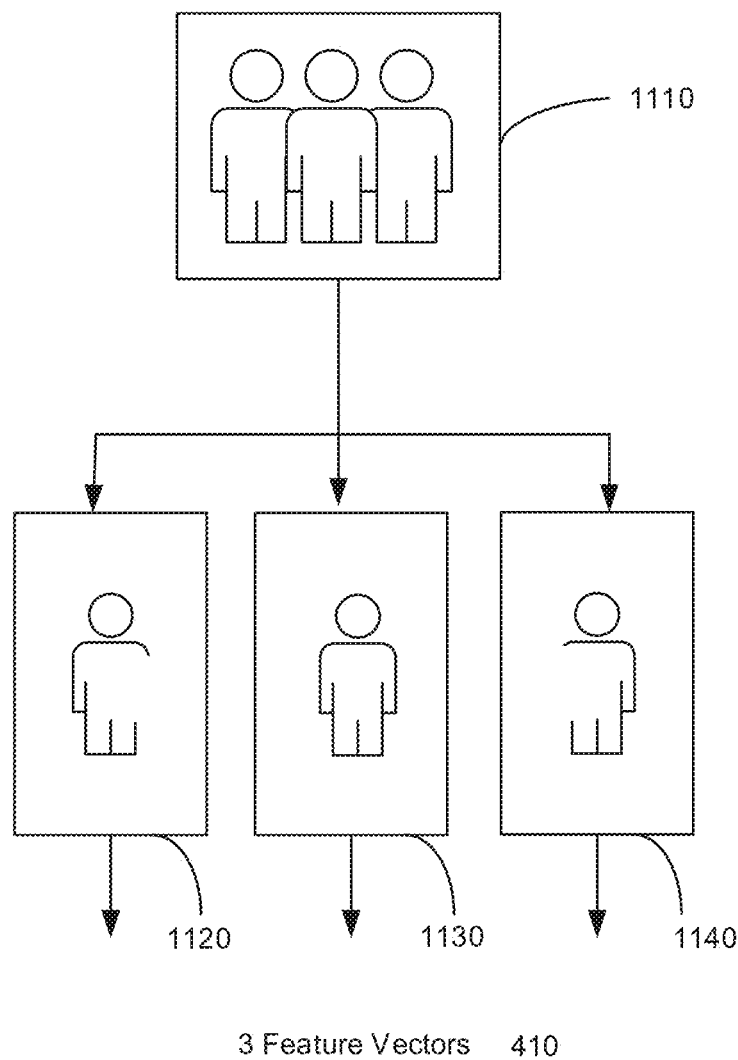
FIG. 11 illustrates a flow diagram of an example embodiment of generating cropped bounding boxes.
Figure 12:
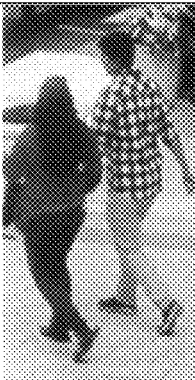
FIG. 12 illustrates examples of images as seen by a camera, padded cropped bounding boxes, and cropped bounding boxes generated by the analytics module.

Referring now to FIG. 11, therein is illustrated a flow diagram of Process 408 of FIGS. 11A and 11B according to another exemplary embodiment. For a given cropped bounding box 1110 (whether non-Padded or Padded) that has three human objects, the first neural network 1010 detects each of the three human objects and outlines the images of each of the three human objects into cropped bounding boxes 1120, 1130, 1140. The feature vectors of the cropped bounding boxes 1120, 1130, 1140 are then generated by the second neural network 1030. The cropped bounding boxes 1120, 1130, 1140 with their associated feature vectors replace the given cropped bounding box 1110 of the cropped bounding boxes 404 in the index 412 and the database 414. In an alternative embodiment with an image containing multiple objects, only the object that maximally overlaps is kept (cropped bounding box 1130) and the other cropped bounding boxes are discarded.

Thus in an embodiment, object detection is performed in two stages: (1) camera 108 performs a less accurate, but power-efficient object detection, and sends padded object cropped bounding boxes to server 406. Padding the cropped bounding box gives the server-side algorithm more pixel context to perform object detection and allows the server-side algorithm to recover parts of the objects that were truncated by the camera-side algorithm; then (2) the server 406, using a more accurate, but more power-intensive algorithm performs object detection on the padded cropped bounding box.

This provides a compromise between network bandwidth usage as the network stream that carries the object cropped bounding boxes may have very low bandwidth. Sending full frames at a high framerate would be impractical in such an environment unless a video codec is used (which would require video decoding on server 406).

If the server-side object detection was performed on an encoded video stream (as the one used for video recording), then it would be necessary to perform video decoding before running the object detection algorithms. However, the computational requirement needed to decode multiple video streams may be too high to be practical.

Thus, in this embodiment, camera 108 performs "approximate" object detection and sends relevant Padded cropped bounding boxes to the server using a relatively low bandwidth communication channel, and therefore camera 108 uses less computer-intensive algorithms to create the Padded cropped bounding boxes that likely contain objects of interest.

While the above description provides examples of the embodiments with human objects as the primary objects of interest, it will be appreciated that the underlying methodology of extracting cropped bounding boxes from objects, computing a feature vector representation from them and furthermore, using this feature vector as a basis to compare against feature vectors from other objects, is agnostic of the class of the object under consideration. A specimen object could include a bag, a backpack or a suitcase, for example. An appearance search system to locates vehicles, animals, and inanimate objects may accordingly be implemented using the features and/or functions as described herein without departing from the spirit and principles of operation of the described embodiments.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto. Furthermore, any feature of any of the embodiments described herein may be suitably combined with any other feature of any of the other embodiments described herein.

The invention claimed is:

1. An appearance search system comprising:
   one or more cameras configured to capture video of a scene, the video having images of objects;
   one or more processors and memory comprising computer program code stored on the memory and configured when executed by the one or more processors to cause the one or more processors to perform a method comprising:
      identifying one or more of the objects within the images of the objects, wherein the identifying comprises:
         identifying multiple ones of the objects within at least one of the images; and
         dividing the at least one of the images into multiple divided images, each divided image of the multiple divided images comprising at least a portion of one of the identified objects; and
      implementing a learning machine configured to generate signatures of the identified objects and generate a signature of an object of interest; and
   a network configured to send the images of the objects from the camera to the one or more processors,
   wherein the method further comprises:
      comparing the signatures of the identified objects with the signature of the object of interest to generate similarity scores for the identified objects; and
      transmitting an instruction for presenting on a display one or more of the images of the objects based on the similarity scores.

2. The system of claim 1, wherein the implemented learning machine is a second learning machine, wherein the identifying is performed by a first learning machine implemented by the one or more processors, and wherein the method further comprises:
   for each identified object:
      determining a confidence level; and
      if the confidence level does not meet a confidence requirement, then causing the identifying and the dividing to be performed by the first learning machine; or
      if the confidence level meets the confidence requirement, then causing the identifying and the dividing to be performed by the second learning machine.

3. A method comprising:
   capturing video of a scene, the video having images of objects;
   identifying one or more of the objects within the images of the objects, wherein the identifying comprises:
      identifying multiple ones of the objects within at least one of the images; and
      dividing the at least one of the images into multiple divided images, each divided image of the multiple divided images comprising at least a portion of one of the identified objects;
   generating, using a learning machine, signatures of the identified objects, and a signature of an object of interest;
   generating similarity scores for the identified objects by comparing the signatures of the identified objects with the signature of the object of interest; and
   presenting on a display one or more of the images of the objects based on the similarity scores.

4. The method of claim 3, wherein the learning machine is a second learning machine, wherein the identifying is performed by a first learning machine, and wherein the method further comprises:
   for each identified object:
      determining a confidence level; and
      if the confidence level does not meet a confidence requirement, then causing the identifying and the dividing to be performed by the first learning machine; or
      if the confidence level meets the confidence requirement, then causing the identifying and the dividing to be performed by the second learning machine.

5. A non-transitory computer-readable medium having stored thereon computer program code executable by one or more processors and configured when executed by the one or more processors to cause the one or more processors to perform a method comprising:
   capturing video of a scene, the video having images of objects;
   identifying one or more of the objects within the images of the objects, wherein the identifying comprises:
      identifying multiple ones of the objects within at least one of the images; and dividing the at least one of the images into multiple divided images, each divided image of the multiple divided images comprising at least a portion of one of the identified objects;

generating, using a learning machine, signatures of the identified objects, and a signature of an object of interest;

generating similarity scores for the identified objects by comparing the signatures of the identified objects with the signature of the object of interest; and presenting on a display one or more of the images of the objects based on the similarity scores.

6. The non-transitory computer-readable medium of claim 5, wherein the learning machine is a second learning machine, wherein the identifying is performed by a first learning machine, and wherein the method further comprises:

for each identified object:
  determining a confidence level; and
  if the confidence level does not meet a confidence requirement, then causing the identifying and the dividing to be performed by the first learning machine; or
  if the confidence level meets the confidence requirement, then causing the identifying and the dividing to be performed by the second learning machine.

7. A system comprising: one or more cameras configured to capture video of a scene; and one or more processors and memory comprising computer program code stored on the memory and configured when executed by the one or more processors to cause the one or more processors to perform a method comprising: extracting chips from the video, wherein the chips comprise images of objects; identifying multiple objects within at least one of the chips; and dividing the at least one chip into multiple divided chips, each divided chip of the multiple divided chips comprising at least a portion of one of the identified objects, wherein the method further comprises: implementing a learning machine configured to generate signatures of the identified objects and generate a signature of an object of interest, and wherein the learning machine is a second learning machine, and wherein the identifying and the dividing are performed by a first learning machine implemented by the one or more processors.

8. The system of claim 7, wherein the method further comprises: for each identified object: determining a confidence level; and if the confidence level does not meet a confidence requirement, then causing the identifying and the dividing to be performed by the first learning machine; or if the confidence level meets the confidence requirement, then causing the identifying and the dividing to be performed by the second learning machine.

9. The system of claim 8, wherein the one or more cameras comprise one or more video analytics modules for determining the confidence level.

10. The system of claim 7, wherein the at least one chip comprises at least one padded chip, wherein each padded chip comprises a first image portion of an image frame of the video.

11. The system of claim 10, wherein the at least one chip further comprises at least one non-padded chip, wherein each non-padded chip comprises a second image portion of an image frame of the video, the second image portion being smaller than the first image portion.

* * * * *